(12) United States Patent
Rittmeyer et al.

(10) Patent No.: US 9,017,582 B2
(45) Date of Patent: Apr. 28, 2015

(54) PROCESS FOR PREPARING LITHIUM SULFIDE

(75) Inventors: Peter Rittmeyer, Sulzbach/Taunus (DE); Ulrich Wietelmann, Friedrichsdorf (DE); Uwe Lischka, Frankfurt am Main (DE); Dieter Hauk, Friedberg (DE); Bernhard Füger, Frankfurt am Main (DE); Armin Stoll, Hemsbach (DE); Dirk Dawidowski, Friedberg (DE)

(73) Assignee: Chemetall GmbH, Frankfurt am Main (DE)

( * ) Notice: Subject to any disclaimer, the term of this patent is extended or adjusted under 35 U.S.C. 154(b) by 0 days.

(21) Appl. No.: 14/119,980

(22) PCT Filed: May 29, 2012

(86) PCT No.: PCT/EP2012/060014
§ 371 (c)(1),
(2), (4) Date: Nov. 25, 2013

(87) PCT Pub. No.: WO2012/163900
PCT Pub. Date: Dec. 6, 2012

(65) Prior Publication Data
US 2014/0084224 A1    Mar. 27, 2014

(30) Foreign Application Priority Data
May 27, 2011    (DE) .................. 10 2011 076 572

(51) Int. Cl.
| | | |
|---|---|---|
| H01B 1/06 | (2006.01) | |
| C01B 17/22 | (2006.01) | |
| C01D 15/00 | (2006.01) | |
| H01M 4/136 | (2010.01) | |
| H01M 4/58 | (2010.01) | |
| H01M 10/052 | (2010.01) | |

(52) U.S. Cl.
CPC .............. C01B 17/22 (2013.01); C01D 15/00 (2013.01); H01M 4/136 (2013.01); H01M 4/5815 (2013.01); H01M 10/052 (2013.01); Y02E 60/122 (2013.01)

(58) Field of Classification Search
CPC .......... C01B 17/22; C01D 15/00; C03C 3/32; H01M 10/0525; H01M 4/136; H01M 4/58
USPC ............................ 252/519.4; 423/511, 566.2
See application file for complete search history.

(56) References Cited

U.S. PATENT DOCUMENTS

| | | | | |
|---|---|---|---|---|
| 3,615,191 | A | * | 10/1971 | Bach et al. .................. 423/566.2 |
| 3,642,436 | A | | 2/1972 | Smith |
| 4,126,666 | A | | 11/1978 | Jacob et al. |
| 6,680,145 | B2 | | 1/2004 | Obrovac et al. |
| 7,959,882 | B2 | | 6/2011 | Bramnik et al. |
| 8,075,865 | B2 | * | 12/2011 | Deiseroth et al. ............. 423/508 |
| 8,084,160 | B2 | | 12/2011 | Seino et al. |
| 2003/0031931 | A1 | * | 2/2003 | Obrovac et al. .......... 429/231.95 |
| 2005/0118093 | A1 | | 6/2005 | Senga et al. |

FOREIGN PATENT DOCUMENTS

| | | | |
|---|---|---|---|
| DE | 10 2007 048 289 | A1 | 4/2009 |
| EP | 0 802 159 | A1 | 10/1997 |
| EP | 1 460 039 | A1 | 9/2004 |
| EP | 1 681 263 | A1 | 7/2006 |
| EP | 1681263 | A1 * | 7/2006 |
| JP | 2004348973 | * | 9/2004 |
| JP | 2004-348973 | A | 12/2004 |
| WO | WO 2004093099 | A1 * | 10/2004 |
| WO | 2008/125647 | A2 | 10/2008 |

OTHER PUBLICATIONS

McKenna, Phil. "Packing more into Lithium Batteries". MIT Technology Review. Total 3 pages.*

* cited by examiner

*Primary Examiner* — Khanh Tuan Nguyen
*Assistant Examiner* — Danny N Kang
(74) *Attorney, Agent, or Firm* — Norton Rose Fulbright US LLP

(57) ABSTRACT

The invention relates to a novel process for preparing lithium sulfide and to the use thereof, wherein a reaction of lithium-containing strong bases with hydrogen sulfide is undertaken in an aprotic organic solvent within the temperature range from −20 to 120° C. under inert conditions. The lithium sulfide obtained by the process is used as a positive material in a galvanic element or for the synthesis of Li ion-conductive solids, especially for the synthesis of glasses, glass ceramics or crystalline products.

20 Claims, No Drawings

PROCESS FOR PREPARING LITHIUM SULFIDE

This application is a §371 of International Application No. PCT/EP2012/060014 filed May 29, 2012, and claims priority from German Patent Application No. 10 2011 076 572.7 filed May 27, 2011.

The invention relates to a novel method for preparing lithium sulfide, and use thereof.

Lithium sulfide is currently of interest as a raw material for the synthesis of Li ion-conductive solids (glass, glass ceramics, or crystalline products such as Li argyrodite) or as cathode material in lithium-sulfur batteries. Lithium-sulfur batteries have a much higher energy density than lithium-ion batteries, and are therefore of great interest for potential use in the area of electromobility.

The following methods for preparing lithium sulfide are described in Gmelin's Handbook of Inorganic Chemistry, Lithium, Supplementary Volume (1969):
  Compounding of lithium metal and sulfur;
  Reaction of ammonium sulfide or sulfur with lithium metal in liquid ammonia;
  Reaction of lithium ethoxide with $H_2S$ in ethanol.

In all these methods, product mixtures containing more or less polysulfide result which must sometimes be laboriously purified. Thus, it is known to reduce lithium sulfate with carbon or hydrogen at temperatures of approximately 500° C. The document EP 0 802 159 A1 describes the reaction of lithium hydroxide with hydrogen sulfide in the gaseous phase in a temperature range of 130° to 445° C. In addition, the document U.S. Pat. No. 4,126,666 A1 describes a reaction of lithium carbonate with hydrogen sulfide in the gaseous phase in a temperature range of 500° to 700° C.

Furthermore, the reaction of lithium metal or lithium hydride with hydrogen sulfide in etheric solvents such as tetrahydrofuran (THF) is known from the documents U.S. Pat. No. 3,615,191 A1 and U.S. Pat. No. 3,642,436 A1. A mixture composed of lithium sulfide ($Li_2S$) and lithium hydrogen sulfide (LiSH) is formed in these reactions. The undesirable LiSH may be converted to $Li_2S$ and hydrogen sulfide by thermal treatment at 180°-200° C.

Lastly, the reaction of lithium hydroxide or lithium carbonate with hydrogen sulfide in N-methylpyrrolidone as solvent at 130° C. is known from the document EP 1 460 039 A1, initially resulting in LiSH and then formation of $Li_2S$ at 200° C. The document EP 1 681 263 A1 proposes purification of $Li_2S$, which has been obtained by the reaction of lithium hydroxide with hydrogen sulfide in an aprotic organic solvent, by washing with an organic solvent at temperatures above 100° C.

The object of the invention is to provide a simple method by means of which lithium sulfide may be prepared in high purity under the most economical, simple reaction conditions possible.

The object is achieved according to the invention by a method in which lithium-containing strong bases are reacted with hydrogen sulfide in an aprotic organic solvent in a temperature range of −20° to 120° C., preferably in a temperature range of 0° to 80° C., under inert conditions. Within the meaning of the invention, "under inert conditions" is understood to mean operation under protective gas to exclude air and atmospheric moisture.

To this end, gaseous hydrogen sulfide is introduced into a solution of an Li-containing strong base in an aprotic solvent. The reaction proceeds spontaneously at room temperature, and is exothermic. The lithium sulfide precipitates as a white solid, and after the reaction is complete may be isolated by filtration and drying. The lithium-containing strong bases are selected from the group comprising lithium alkylene, lithium arylene, and lithium amides, and react according to the following equations:

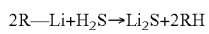

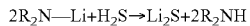

In the X-ray diffraction diagram, the isolated material displays only lines for the desired $Li_2S$, and by-products such as LiSH are not detectable.

The strong Li-containing bases which are used are preferably commercially available materials or solutions of butyllithium or hexyllithium in hydrocarbons, or organolithium amides, preferably lithium diisopropylamide or lithium hexamethyldisilazide in various aprotic solvents.

Typical aprotic solvents are aliphatic and aromatic hydrocarbons, preferably hexane or toluene, as well as etheric solvents selected from the group of aliphatic or cyclic ethers, preferably diethyl ether, THF, or mixtures of these solvents.

The advantages of the method according to the invention over the prior art are as follows:
  Use of commercially available starting materials;
  Avoidance of operations using air- and moisture-sensitive solids such as Li metal or LiH;
  Carrying out the reaction at moderate temperatures, so that additional energy for heating or cooling is not required;
  Isolation of the product using simple methods such as filtration and drying;
  Obtaining a product in a pure phase, thus avoiding further purification steps such as heating to destroy LiSH.

The lithium sulfide obtained according to the invention is used as a positive electrode composition in a galvanic element, for the synthesis of Li ion-conductive solids, in particular for the synthesis of glass, glass ceramics, or crystalline products, and particularly preferably for the synthesis of Li argyrodite.

EXAMPLE 1

Preparation of Lithium Sulfide from Hydrogen Sulfide 1000 g (1449 mL, 3.47 mol, 1.0 eq.) n-butyllithium (2.4 M in hexane) was placed in an inerted 3-L flat-flange double-shell reactor having a temperature sensor, gas inlet tube (immersion tube), and gas discharge line (above a gas meter and gas scrubber) under an argon atmosphere, and an additional 380 mL hexane was then added. The reaction solution was cooled to 10° C. with stirring. A total of 59 g (38.7 L, 1.73 mol, 0.5 eq.) hydrogen sulfide was then introduced into the reaction solution through an immersion tube at 10-15° C. over a period of 3 h, resulting in precipitation of a colorless solid. To keep the reaction suspension stirrable, an additional total quantity of 550 mL hexane was added. After completion of the gas introduction, the reactor contents were heated to room temperature (22° C.) and stirred for an additional 2 h. The reaction suspension was then filtered through a G3 frit, and the remaining colorless solid was thoroughly washed with several portions of hexane. The solid obtained was dried to a constant weight under high vacuum at room temperature, then analyzed by X-ray diffractometry (XRD). Lithium sulfide in a pure phase was obtained.

The invention claimed is:
1. A method for preparing lithium sulfide comprising:
  reacting a lithium-containing base selected from the group consisting of a lithium alkylene, a lithium arylene, and a lithium amide with hydrogen sulfide in an aprotic organic solvent at a temperature of from −20° to 120° C. under inert conditions, wherein the aprotic organic solvent comprises at least one member selected from the group consisting of an aliphatic hydrocarbon, an aromatic hydrocarbon and an etheric solvent.

2. A method according to claim 1, wherein the lithium-containing base is butyllithium.

3. A method according to claim 1, wherein the lithium-containing base is selected from the group consisting of butyllithium, hexyllithium, lithium diisopropylamide and lithium hexamethyldisilazide.

4. A method according to claim 1, wherein the aprotic organic solvent is the etheric solvent.

5. A method according to claim 1, wherein the aprotic organic solvent comprises at least one member selected from the group consisting of hexane, toluene, diethyl ether, and tetrahydrofuran.

6. A method according to claim 1, wherein the reaction is carried out at a temperature range of 0° to 80° C.

7. A positive electrode comprising the lithium sulfide prepared by the process of claim 1 and a galvanic element.

8. A Li ion-conductive solids comprising the lithium sulfide prepared by the method of claim 1.

9. A glass, glass ceramics, or crystalline product comprising the lithium sulfide prepared by the method of claim 1.

10. Li argyrodite prepared with the lithium sulfide prepared by the method of claim 1.

11. A method according to claim 2, wherein the aprotic organic solvent is the etheric solvent.

12. A method according to claim 3, wherein the aprotic organic solvent is the etheric solvent.

13. A method according to claim 2, wherein the aprotic organic solvent comprises at least one member selected from the group consisting of hexane, toluene, diethyl ether, and tetrahydrofuran.

14. A method according to claim 3, wherein the aprotic organic solvent comprises at least one member selected from the group consisting of hexane, toluene, diethyl ether, and tetrahydrofuran.

15. A glass, glass ceramics, or crystalline product according to claim 9, wherein the reaction is carried out at a temperature range of 0° to 80° C.

16. Li argyrodite according to claim 10, wherein the reaction is carried out at a temperature range of 0° to 80° C.

17. A method according to claim 4, wherein the reaction is carried out at a temperature range of 0° to 80° C.

18. A method according to claim 5, wherein the reaction is carried out at a temperature range of 0° to 80° C.

19. Li argyrodite according to claim 10, wherein the aprotic organic solvent comprises at least one member selected from the group consisting of hexane, toluene, diethyl ether, and tetrahydrofuran.

20. Li argyrodite according to claim 16, wherein the aprotic organic solvent comprises at least one member selected from the group consisting of hexane, toluene, diethyl ether, and tetrahydrofuran.

* * * * *